US006769183B2

(12) United States Patent
Schmidt (10) Patent No.: US 6,769,183 B2
(45) Date of Patent: Aug. 3, 2004

(54) CABLE CUTTING TOOL (75) Inventor: Mark A. Schmidt, Hastings, MI (US)

(73) Assignee: Hastings Fiber Glass Products, Inc., Hastings, MI (US)

(*) Notice: Subject to any disclaimer, the term of this patent is extended or adjusted under 35 U.S.C. 154(b) by 13 days.

(21) Appl. No.: 10/263,150

(22) Filed: Oct. 2, 2002

(65) Prior Publication Data
US 2004/0064954 A1 Apr. 8, 2004

(51) Int. Cl.[7] ............................................... B26B 13/14
(52) U.S. Cl. ........................................... 30/250; 30/249
(58) Field of Search ......................... 30/188, 187, 250, 30/249

(56) References Cited

U.S. PATENT DOCUMENTS

| 2,643,564 A | * | 6/1953 | Klein et al. ................... 81/314 |
| 2,993,275 A | * | 1/1961 | Naito .......................... 30/250 |
| 3,084,432 A |   | 4/1963 | Hill |

* cited by examiner

Primary Examiner—Douglas D. Watts
(74) Attorney, Agent, or Firm—Flynn, Thiel, Boutell & Tanis, P.C.

(57) ABSTRACT

A cable cutting tool includes a first arm having a first jaw member connected to a first handle member and a second arm having a second jaw member pivotally connected to a second handle member. The first and second arms are connected by a fastener and are pivotal with respect to one another about a longitudinal axis of the fastener. A tension element is mounted on the second jaw member and is positioned wholly outside of and out of contact with the second handle member. A take-up element is mounted for rotation on the second jaw member. A latching mechanism is mounted on the second jaw member and is configured to inhibit rotation of the take-up element in a first direction. The take-up element is uninhibited by the latching mechanism when rotating in a second direction. A chain extends over the take-up element and has a first end attached to the first arm and a second end attached to the tension element. The chain is positioned wholly outside of and out of contact with the second handle member.

9 Claims, 6 Drawing Sheets

CABLE CUTTING TOOL

FIELD OF THE INVENTION

This invention relates generally to a cable cutting tool and, more particularly, to a cable cutting tool having no electrically conductive components positioned in either of the insulated handle members.

BACKGROUND OF THE INVENTION

Ratcheting cable cutters have found particular usefulness in a number of applications. One such cutter is disclosed in U.S. Pat. No. 3,084,432, which issued to Hill on Apr. 9, 1963. The cutter disclosed in the Hill patent has first and second arms that are pivotal with respect to one another. The first arm is a simple lever arm having a jaw end and a handle end. The second arm is a compound arm having a jaw member that is pivotally attached to a handle member. A chain extends between the first and second arms. A first end of the chain is attached to the handle end of the first arm and a second end of the chain is attached to an elongate tension spring positioned in a chamber inside the handle member of the second arm. To cut a cable, the handles are pulled apart, causing the jaws to open. Once the jaws are open, the cable to be cut is positioned between them. For a cable which is relatively easy to sever, the handles are then closed, causing the jaws to close around the cable and sever it. To cut a thicker cable, or an object such as a bolt made of a relatively hard material, the compound arm can be pumped to create greater force to sever the cable.

While previous ratcheting cable cutters, such as the cable cutter disclosed in the Hill patent, have performed suitably, there remains room for improvement. For instance, as indicated above, the metallic chain of traditional cable cutters is drawn into one of the handle members. However, if the cable cutter is to be used to cut electrically conducting wires or cables, it is desirable that the handles be non-electrically conducting. It is further desirable to remove all electrically conductive components from the handles.

SUMMARY OF THE INVENTION

The objects and purposes of the present invention are met by providing a cable cutting tool including a first arm having a first jaw member connected to a first handle member. The cable cutting tool includes a second arm that has a second jaw member which is pivotally connected to a second handle member. The first arm is connected to the second arm by a fastener. The first and second arms are pivotal with respect to one another about a longitudinal axis of the fastener. A tension element is mounted on the second jaw member and is positioned wholly outside of and out of contact with the second handle member. A take-up element is mounted on the second jaw member and is configured to rotate about an axis of rotation. A latching mechanism is mounted on the second jaw member and is configured to inhibit rotation of the take-up element in a first rotational direction. The take-up element is uninhibited by the latching mechanism when the take-up element rotates in a second rotational direction. A chain extends over the take-up element and has a first end that is attached to the first arm and a second end that is attached to the tension element. The chain is positioned wholly outside of and out of contact with the second handle member. The cable cutting tool discussed herein is suitable for cutting a variety of wires, such as soft wire, ACSR wire and guy wire. In addition, the cutter is suitable for cutting relatively hard items such as bolts.

BRIEF DESCRIPTION OF THE DRAWINGS

The above and further features and benefits of this invention will be understood by reference to the following detailed description, as well as by reference to the following drawings in which.

DETAILED DESCRIPTION

Figure 1:
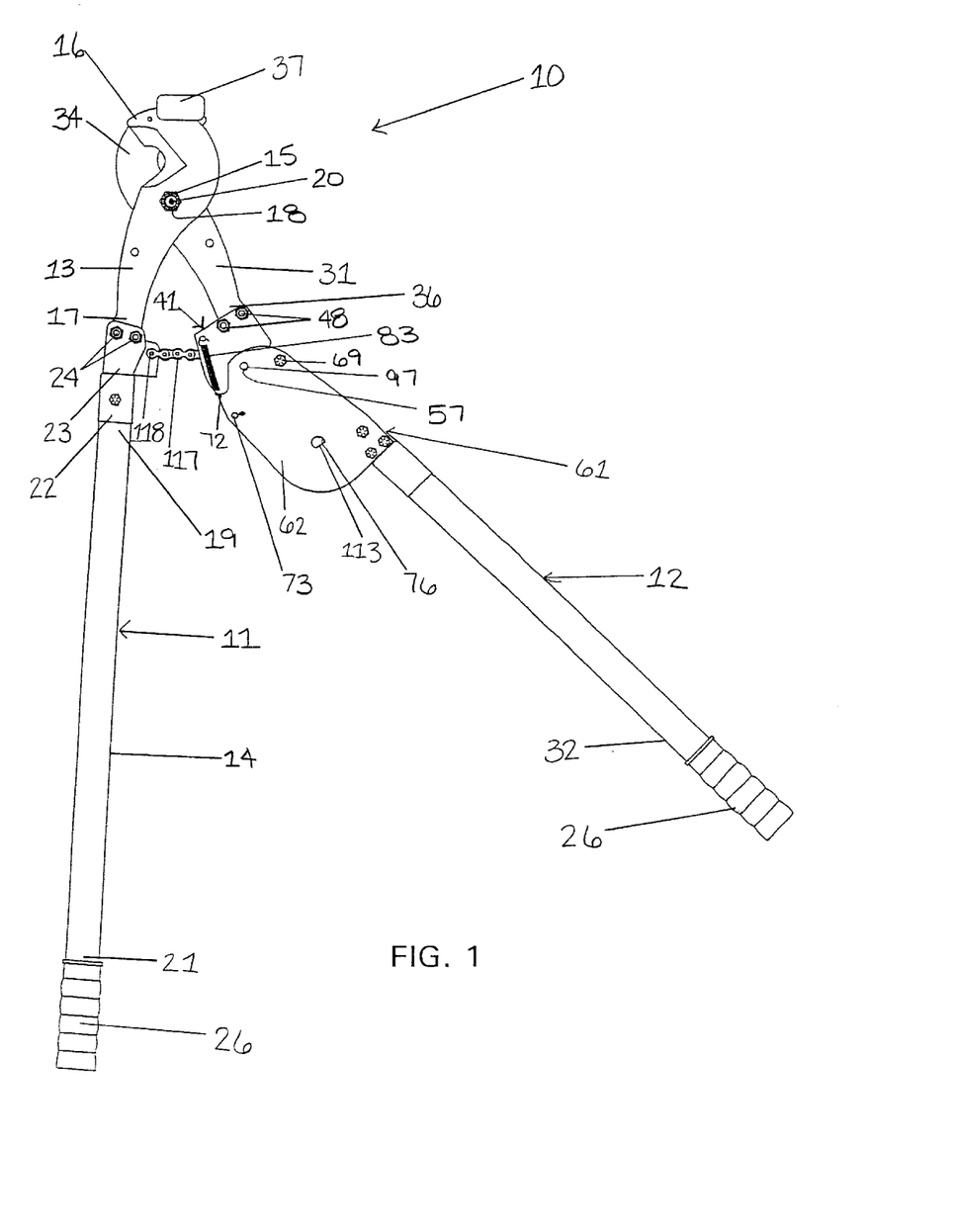
FIG. 1 is a front view of a cable cutting tool according to the present invention in a first position.
Figure 2:
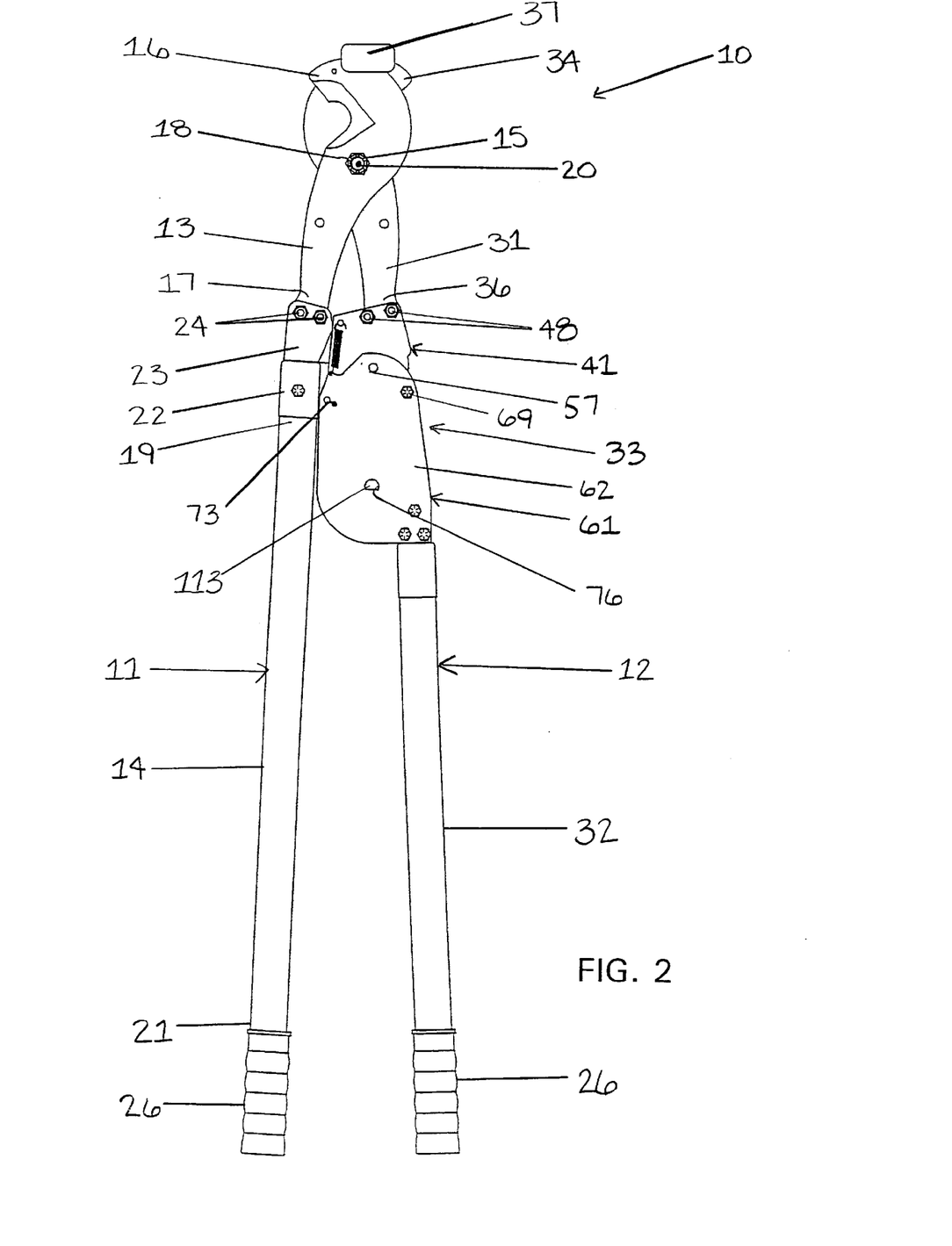
FIG. 2 is a front view of the FIG. 1 cable cutting tool in a second position.

Referring to FIGS. 1 and 2 there is illustrated a cable cutting tool 10 according to the present invention. The cable cutting tool 10 includes a first arm 11 that is pivotally attached to a second arm 12.

The first arm 11 has a jaw member 13 which is rigidly attached to a handle member 14. The jaw member 13 is composed of a suitable material, such as steel. The jaw member 13 has a curved upper end 16 which is configured as a cutting claw and a lower end 17. A bore 18 extends through a midsection of the jaw member 13. The handle member 14 has an upper end 19 that is spaced apart from a lower end 21. An end cap 22 is positioned over the upper end 19 of the handle member 14. Two spaced apart arms 23 (one of which is visible in FIGS. 1 and 2) extend upward from the end cap 22. The end cap 22 is composed of steel or another suitable material whereas the remainder of the handle member 14 is formed from a non-electrically conductive material such as fiberglass. It will be appreciated that the non-electrically conductive section of the handle member 14 should be insulated, if necessary, to the appropriate safety level. For instance, where appropriate, this portion of the handle member 14 should be sufficiently insulated to meet OSHA live line tool testing requirements. The lower end 17 of the jaw member 13 is received between the arms 23 extending from the end cap 22 and is secured thereto by one or more fasteners, such as bolts 24. A hand grip 26 is fitted over the lower end 21 of the handle member 14.

The second arm 12 includes a jaw member 31 separated from a handle member 32 by a bracket 33. The jaw member 31 has an upper end 34 and a lower end 36. The upper end 34 (partially visible in FIGS. 1 and 2) is configured as a cutting claw and is virtually identical to the upper end 16 of the jaw member 13. A U-shaped bracket 37 is secured to the jaw member 31 near the apex of the upper end cutting claw 34 by a suitable fastening means, such as one or more bolts (not shown) and acts to maintain proper alignment of the jaw members 13 and 31. A bore (not shown) extends through the midsection of the jaw member 31.

Figure 3:
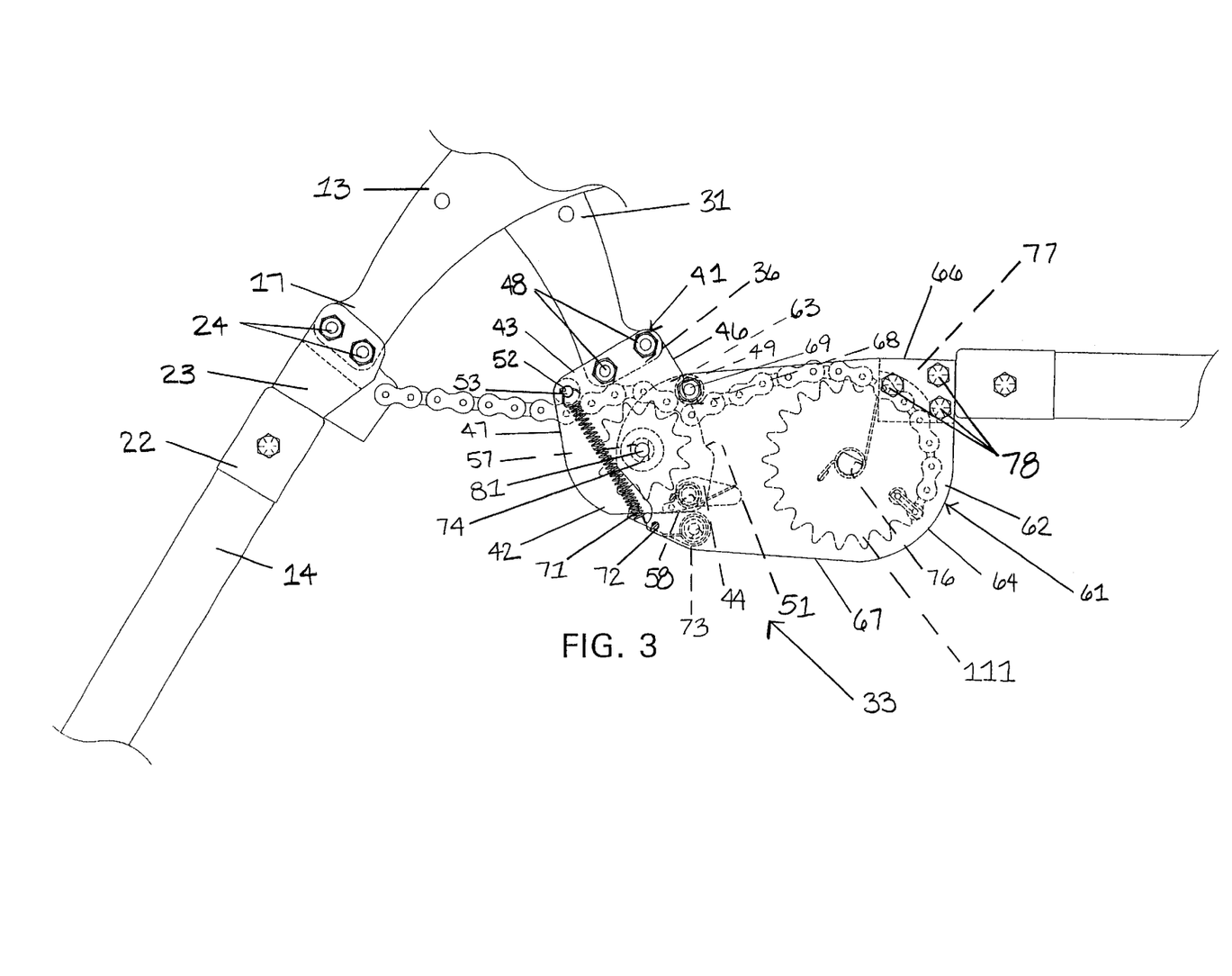
FIG. 3 is an enlarged front view of a fragment of the cable cutting tool of FIG. 1 in a third position.

Referring in addition to FIG. 3, the bracket 33 includes a first bracket component 41 composed of two generally pentagonal shaped plates 42. Each plate 42 has an upper end 43, a lower corner 44 and right and left edges 46 and 47. The lower end 36 of the jaw member 31 is received between the upper ends 43 of the plates 42 and is secured thereto by bolts 48. The right edge 46 of each plate 42 includes a curved surface segment located between an upper shoulder 49 adjacent the upper end 43 and a lower shoulder 51 adjacent the lower corner 44. Axially aligned bores 52 extend through the upper end 43 of each plate 42 near the left edge 47. A pin 53 extends through the bores 52 and has ends that project outward beyond an outer facing surface of each plate 42. A hole (not shown) extends through each end of the pin 53. Axially aligned bores 57 and 58 extend through the midsections and the lower corners 44, respectively, of the plates 42.

The bracket 33 also includes a second bracket component 61 which is formed from two generally rectangular plates 62. Each plate 62 has upper and lower ends 63 and 64 and right and left edges 66 and 67. A bore 68 extends through the upper end 63 of each plate 62 near the right edge 66. The plates 62 are secured to one another in a spaced apart relation by a bolt 69 which extends through the bores 68. An upper left corner 71 of each plate 62 is bent outward. A hole 72 extends through the bent left corner 71 of each plate 62. Three pairs of axially aligned bores extend through the plates 62; a first pair 73 is located near the left edge 67 of the upper ends 63, a second pair 74 is located near the center of the upper ends 63 and a third pair 76 is located near the lower ends 64.

An upper end 77 of the handle member 32 is secured between the lower ends 64 of the second bracket component plates 62 by one or more bolts 78. As illustrated in FIGS. 1 and 2, the second arm handle member 32 is similar to the first arm handle member 14 in both configuration and composition and differs from the handle member 14 only in length. A hand grip 26 (FIGS. 1 and 2) is fitted over the lower end of the handle member 32.

Figure 4:
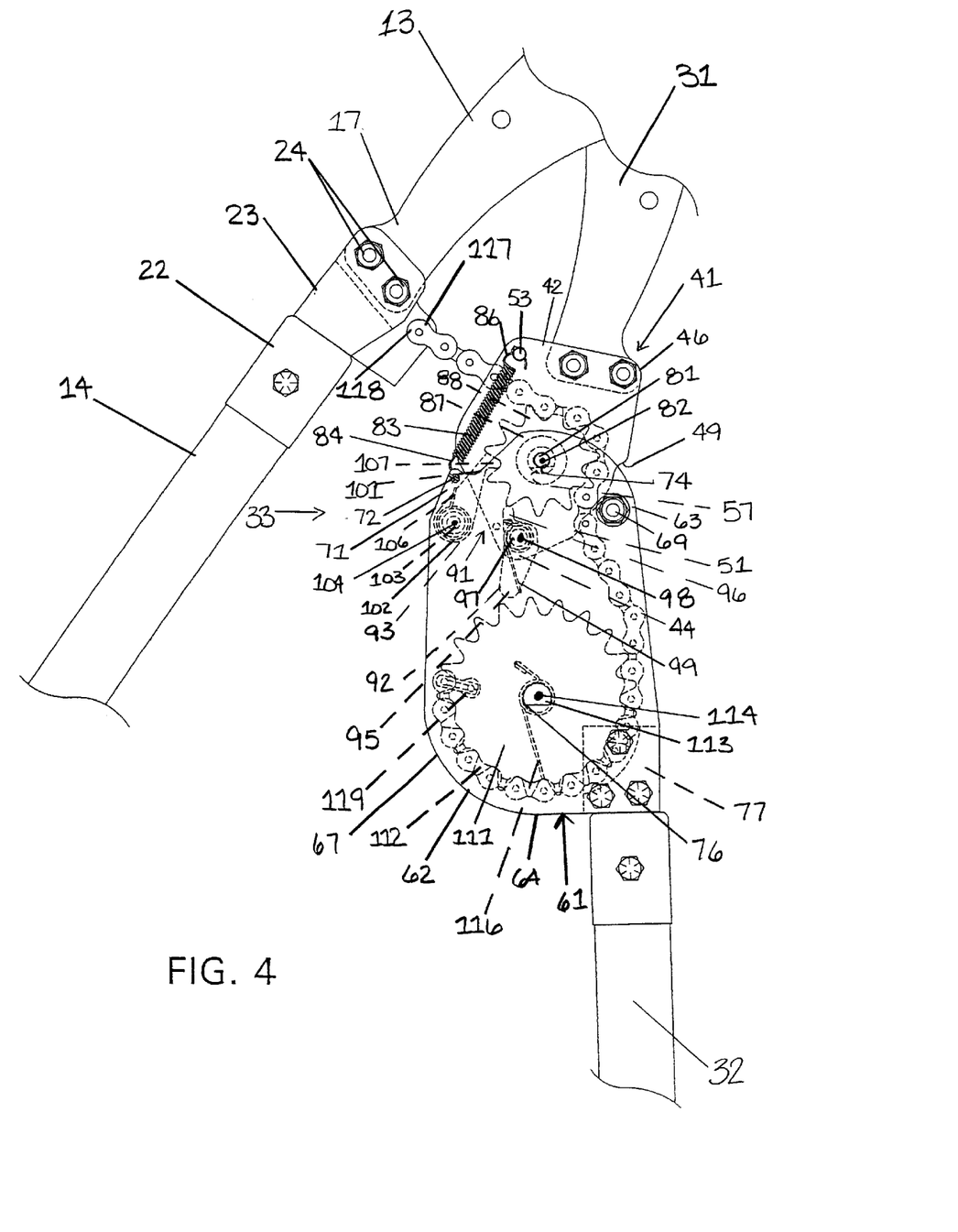
FIG. 4 is a front view of the FIG. 1 cable cutting tool in an intermediate position between the first and second positions, prior to engagement of the first sprocket wheel by the latch mechanism.
Figure 6:
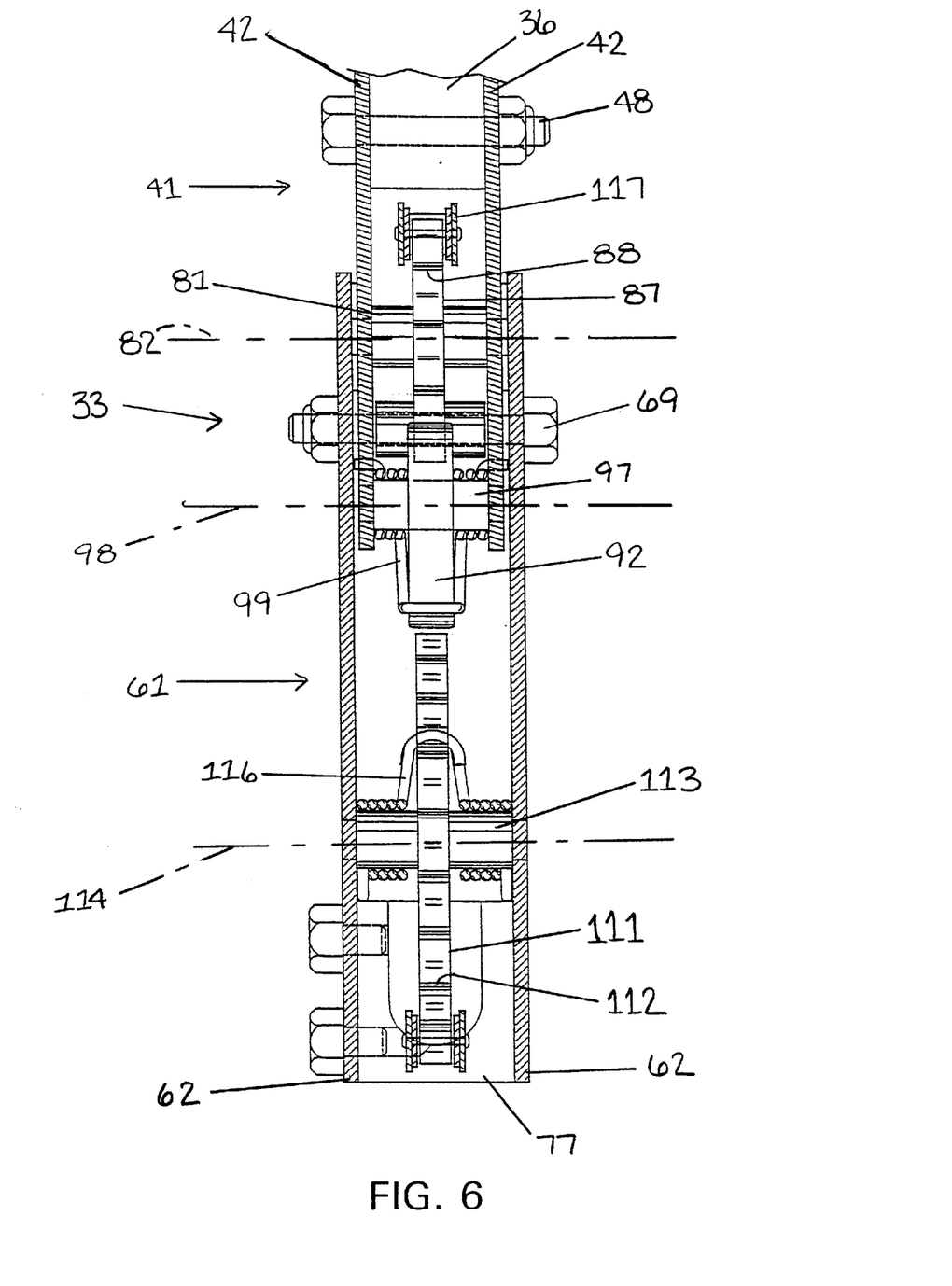
FIG. 6 is a side view of the second arm of the FIG. 1 cutting tool viewed along the section lines 6—6 of FIG. 5.

Referring in addition to FIG. 4, a pin 81 extends through the bores 57 in the midsection of the first bracket component plates 42 and the bores 74 in the upper end 63 of the second bracket component plates 62. The first and second bracket components 41 and 61 can pivot with respect to each other about a longitudinal axis 82 (FIG. 6) of the pin 81 between a first position (FIG. 1) and a second position (FIG. 3). The handle member 32 can thus pivot with respect to the jaw member 31. When the second bracket component 61 pivots with respect to the first bracket component 41, the bolt 69 slides along the right edge 46 of the plates 42 between the shoulders 49 and 51. Thus, the distance the second bracket component 61 can pivot with respect to the first bracket component 41, and therefore the handle member 32 can pivot with respect to the jaw member 31, is limited by the distance between the upper and lower shoulders 49 and 51.

The first and second bracket components 41 and 61 are also coupled by a pair of tension springs 83 (one of which is illustrated in FIG. 4). Each tension spring 83 has a first end 84 that extends through the hole 72 in the bent left corner 71 of one of the plates 62 and a second end 86 that extends through the hole in the end of the pin 53. The tension springs 83 urge the first and second bracket components 41 and 61 toward the first position.

A first wheel 87 that acts as a take-up element is positioned between the first bracket component plates 42. The first wheel 87 can be a first sprocket wheel 87, as illustrated, or it can instead be replaced by any suitable member, such as a cam or a lever. The outer circumference of the sprocket wheel 87 includes a plurality of spaced apart teeth 88. The sprocket wheel 87 is mounted on the pin 81 extending through the first and second bracket component plates 42 and 62. The sprocket wheel 87 is configured to rotate about the longitudinal axis 82 of the pin 81. With reference in particular to FIG. 4, the sprocket wheel 87 can rotate in both the clockwise and counterclockwise directions.

A latching mechanism 91 is mounted between the plates 42 and 62 of the first and second bracket components 41 and 61. The latching mechanism 91 includes a detent pawl 92 and a feeding pawl 93. The detent pawl 92 is positioned between the lower corners 44 of the first bracket component plates 42. The detent pawl 92 has first and second spaced apart ends 94 and 95. Projecting from the detent pawl first end 94 is a hook 96. The pawl 92 is mounted on the plates 42 by a pin 97 extending through the first end 94 of the pawl 92. The pawl 92 is positioned so the hook 96 can engage one of the sprocket wheel teeth 88. The detent pawl 92 is rotatable about a longitudinal axis 98 (FIG. 6) of the pin 97 in both clockwise and counterclockwise directions. The detent pawl 92 is continuously urged toward the clockwise rotational direction by a torsion spring 99, the ends of which are attached to the pin 97.

The feeding pawl 93 has first and second ends 101 and 102 and is mounted between upper left edges 67 of the second bracket component plates 62 by a pin 103 which extends through the second end 102 of the feeding pawl 93. The feeding pawl 93 can rotate about a longitudinal axis 104 of the pin 103 in both the clockwise and counterclockwise directions. A torsion spring 106 is coupled to the feeding pawl 93 and has first and second ends that are attached to the pin 97 on either side of the feeding pawl 93. The torsion spring 106 continuously urges the feeding pawl 93 in the clockwise rotational direction. The first end 101 of the feeding pawl 93 is configured as a hook 107. The feeding pawl 93 is positioned so the hook 107 can engage one of the sprocket wheel teeth 88.

A tension element 111 is positioned between the plates 62 of the second bracket component 61. The tension element 111 can be a sprocket wheel 111, as illustrated, or any suitable element, such as a wheel, cam or lever. When the tension element is a second sprocket wheel 111, a plurality of teeth 112 are spaced about the outer circumference of the sprocket wheel. The second sprocket wheel 111 is mounted between the second bracket component plates 62 by a pin 113 which extends into the bores 76 near the lower ends 64 of the plates 62. The second sprocket wheel 111 is configured to rotate about a longitudinal axis 114 (FIG. 6) of the pin 113 in both clockwise and counterclockwise directions. A torsion spring 116 is coupled to the second sprocket wheel 111. The ends of the torsion spring 116 are secured to the pin 113 on either side of the second sprocket wheel 111. The torsion spring 116 urges the second sprocket wheel 111 toward rotation in the clockwise direction.

Figure 5:
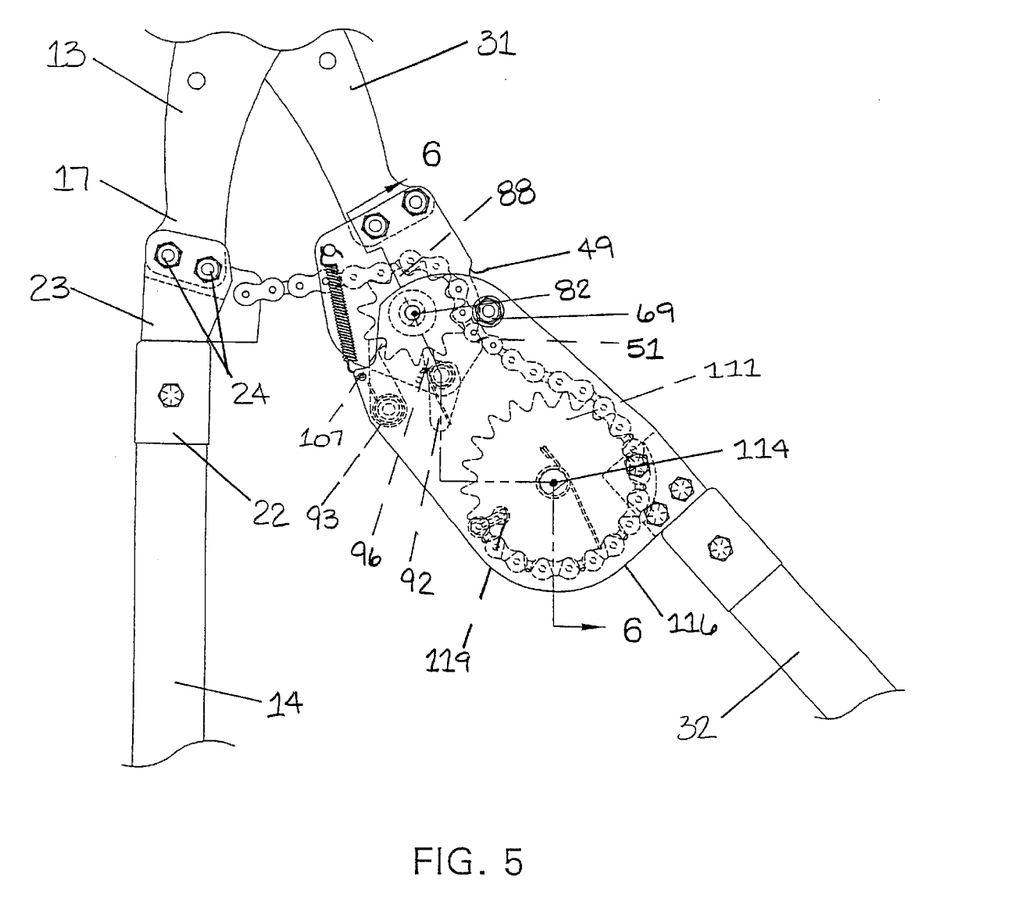
FIG. 5 is a front view of the FIG. 1 cable cutting tool in the second position, wherein the first sprocket wheel is engaged by the latch mechanism.

Returning to FIG. 1, the bore 18 in the jaw member 13 is aligned with the bore in the jaw member 31 and a bolt 15 is inserted therethrough. When the cable cutter 10 is assembled, the first and second arms 11 and 12 are pivotal about a longitudinal axis 20 of the bolt 15 so the jaw members 13 and 31 can open and close with respect to each other. As illustrated in FIG. 5, a chain 117 extends between the first and second arms 11 and 12. The chain 117 has a first end 118 attached to the arms 23 secured to the lower end 17 of the jaw member 13 and a second end 119 attached to the second sprocket wheel 111. When the first and second arms 11 and 12 are moved apart, the force exerted on the chain 117 will cause the second sprocket wheel 111 to be rotated in the counterclockwise direction. The chain 117 will then be unwound from the sprocket wheel 111 as the sprocket wheel 111 is rotated against the urging of torsion spring 116. When the first and second arms 11 and 12 are moved together, the force exerted on the chain 117 will be reduced, thus allowing the torsion spring 116 to rotate the second sprocket wheel 111 in the clockwise direction. The chain 117 will thus be wound around the sprocket wheel 111.

To use the cable cutter 10 of the present invention, the handle members 14 and 32 are pulled away from one another, causing the jaws 13 and 31 to open with respect to each other. When the first handle member 14 moves away from the second handle member 32, the first end 118 of the chain 117 will be pulled away from the second arm 12. Since the second end 119 of the chain 117 is attached to the second sprocket wheel 111, the force exerted on the chain 117 causes the second sprocket wheel 111 to be rotated counterclockwise about the axis 114 of the pin 113 against the urging of the torsion spring 116. As the second sprocket wheel 111 rotates, the chain 117 unwinds from the wheel 111.

As the chain 117 is pulled by the first handle member 14, the links of the chain 117 engage the teeth 88 of the first sprocket wheel 87, moving the sprocket wheel 87 in the counterclockwise direction. When the first sprocket wheel 87 rotates, the feeding pawl 93 engages one of the teeth 88. The hook 107 of the feeding pawl 93 will exert a force on the tooth 88 thereby aiding the sprocket wheel 87 in the counterclockwise rotational movement. Likewise, the hook 96 of the detent pawl 92 will act on the tooth 88 to move the sprocket wheel 87 in the counterclockwise rotational direction.

When the jaw members 13 and 31 are opened a sufficient amount, a cable to be cut is positioned between the jaws. If the cable to be cut is relatively easy to sever, the handles 14 and 32 are moved back together at this point. As the handles 14 and 32 are moved together, the jaws 13 and 31 will close around the cable. The closing action of the jaws 13 and 31 will sever the cable. If the cable to be cut is particularly thick or is otherwise relatively difficult to sever, additional force might be desirable. Thus, prior to moving the handles 14 and 32 together, the second arm handle member 32 is rotated with respect to the second arm jaw member 31 to provide additional force for the cutting action.

As the handle member 32 is rotated with respect to the jaw member 31, the second bracket component 61 pivots with respect to the first bracket component 41. The pivoting movement of the second bracket component 61 causes the feeding pawl 93 to move toward the detent pawl 92. The pivoting movement also causes the chain 117 to further unwind from the second sprocket wheel 111. As the chain 117 unwinds, the teeth 88 of the first sprocket wheel 87 are engaged and the first sprocket wheel 87 is rotated in the counterclockwise direction. Movement of the second bracket component 61 with respect to the first bracket component 41 causes the feeding pawl 93 to strike the detent pawl 92 as the hook 107 of the feeding pawl 93 moves over a tooth 88 of the rotating sprocket wheel 87. The hook 107 of the feeding pawl 93 engages the hook 96 of the detent pawl 92 and disengages the detent pawl 92 from the first sprocket wheel 87. Both pawls 92 and 93 are now urged away from the first sprocket wheel 87. The chain 117 unwinds from the second sprocket wheel 111 limited only by the urging of the torsion spring 116 on the second sprocket wheel 111. The handle member 32 can be rotated in this manner until the bolt 69 of the second bracket component 61 abuts the upper shoulder 49 on the first bracket component 41.

Once the handle member 32 is rotated the desired amount, it is moved toward the first arm handle member 14 to close the jaw members 13 and 31 and sever the cable. As the handle members 14 and 32 are moved together, the tension force on the chain 117 is reduced. The reduction in force exerted on the chain 117 results in a reduction in the force exerted on the second sprocket wheel 111 against the urging of the torsion spring 116. Thus, the urging of the torsion spring 116 is sufficient to rotate the second sprocket wheel 111 in a clockwise direction. This rotation causes the chain 117 to be wound around the second sprocket wheel 111. As the chain 117 is pulled in by the second sprocket wheel 111, the teeth 88 of the first sprocket wheel 87 are engaged by the chain 117. The first sprocket wheel 87 thus rotates in a clockwise direction as the chain 117 winds around the second sprocket wheel 111.

As the jaw members 13 and 31 are being closed, the second arm handle member 32 is also pivoting with respect to the jaw member 31. The feeding pawl 93 is moved away from the detent pawl 92 by the pivoting movement of the second bracket component 61 with respect to the first bracket component 41. Once the detent pawl 92 moves away from the feeding pawl 93, the hook 107 is pivoted toward the first sprocket wheel 87 under the action of the torsion spring 106. The hook 107 then engages a tooth 88 on the first sprocket wheel 87. As the handle member 32 continues to rotate, the detent pawl 92 also engages a tooth 88 on the first sprocket wheel 87. The feeding pawl 93 moves the first sprocket wheel 87 in the clockwise direction, which in turn helps to advance the chain 117 toward the second sprocket wheel 111.

It should be appreciated that the foregoing description is for the purposes of illustration only, and alternative embodiments of this invention are possible without departing from the scope of the claims.

Thus, although particular preferred embodiments of the present invention have been disclosed in detail for illustrative purposes, it will be recognized that variations or modifications lie within the scope of the present invention and do not depart from the spirit of the invention, as set forth in the foregoing description and drawings, and in the following claims.

What is claimed is:

1. A cable cutting tool comprising:

a first arm having a first jaw member connected to a first handle member;

a second arm having a second jaw member pivotally connected to a second handle member;

said first arm being coupled to said second arm by a fastener, said first and second arms being pivotal with respect to one another about a longitudinal axis of said fastener;

a tension element mounted on said second jaw member and positioned wholly outside of and out of contact with said second handle member;

a take-up element mounted on said second jaw member and configured to rotate about an axis of rotation;

a latching mechanism mounted on said second jaw member and configured to inhibit rotation of said take-up element in a first rotational direction about said axis of rotation, said take-up element being uninhibited by said latching mechanism when said take-up element rotates in a second rotational direction about said axis of rotation; and a chain extending over said take-up element and having a first end attached to said first arm and a second end attached to said tension element, wherein said chain is positioned wholly outside of and out of contact with said second handle member.

2. The cable cutting tool of claim 1, wherein said first handle member and said second handle member are made of a non-electrically conductive material.

3. The cable cutting tool of claim 2, wherein said take-up element is a first wheel, said tension element includes a second wheel and said chain extends over said second wheel and is attached thereto;

said second wheel is configured to rotate about an axis of rotation in a first direction in which said chain is unwound from said second wheel and a second direction in which said chain is wound around said second wheel; and said second wheel is urged toward rotation in said second direction by a torsion spring.

4. The cable cutting tool of claim 3, wherein said first and second wheels are first and second sprocket wheels.

5. The cable cutting tool of claim 4, wherein said latching mechanism includes first and second pawls that are pivotally attached to said second jaw member; and said first and second pawls are configured to engage one or more teeth on said first sprocket wheel when said first sprocket wheel rotates in said first rotational direction.

6. The cable cutting tool of claim 5, wherein said second jaw member includes a bracket that is attached to said second handle member; and said first and second sprocket wheels and said first and second pawls are mounted on said bracket.

7. The cable cutting tool of claim 6, wherein said bracket includes a first bracket component rigidly attached to said second jaw member and a second bracket component rigidly attached to said second handle member; and said first bracket component is pivotally connected to said second bracket component.

8. The cable cutting tool of claim 7, wherein said first sprocket wheel is mounted on said first bracket component and said second sprocket wheel is mounted on said second bracket component; and said first and second bracket components are pivotal with respect to one another about said axis of rotation of said first sprocket wheel.

9. The cable cutting tool of claim 1, wherein said first jaw member is rigidly attached to said first handle member.

* * * * *